United States Patent
Yang et al.

(10) Patent No.: US 10,433,124 B2
(45) Date of Patent: Oct. 1, 2019

(54) SYSTEMS AND METHODS FOR SYNCHRONIZING WIRELESS SENSOR DEVICES CONNECTED TO A CONTROL PANEL DEVICE VIA MULTIPLE ACCESS POINT DEVICES

(71) Applicant: Honeywell International Inc., Morristown, NJ (US)

(72) Inventors: Bin Yang, Shanghai (CN); Hongye Jiang, Shanghai (CN); Kenneth Eskildsen, Great Neck, NY (US)

(73) Assignee: ADEMCO INC., Golden Valley, MN (US)

( * ) Notice: Subject to any disclaimer, the term of this patent is extended or adjusted under 35 U.S.C. 154(b) by 142 days.

(21) Appl. No.: 15/664,711

(22) Filed: Jul. 31, 2017

(65) Prior Publication Data

US 2019/0037336 A1   Jan. 31, 2019

(51) Int. Cl.
| | |
|---|---|
| *G06F 15/173* | (2006.01) |
| *H04W 4/38* | (2018.01) |
| *H04W 56/00* | (2009.01) |
| *G08B 1/08* | (2006.01) |
| *H04W 84/18* | (2009.01) |
| *H04W 92/20* | (2009.01) |

(52) U.S. Cl.
CPC ............... *H04W 4/38* (2018.02); *G08B 1/08* (2013.01); *H04W 56/0015* (2013.01); *H04W 56/0035* (2013.01); *H04W 84/18* (2013.01); *H04W 92/20* (2013.01)

(58) Field of Classification Search
CPC ............... H04W 4/38; H04W 56/0015; H04W 56/0035; H04W 84/18; H04W 92/20; G08B 1/08
See application file for complete search history.

(56) References Cited

U.S. PATENT DOCUMENTS

| | | | |
|---|---|---|---|
| 2011/0216660 A1* | 9/2011 | Lee | H04J 3/06 370/252 |
| 2011/0305232 A1* | 12/2011 | Singamsetty | H04B 1/7143 370/338 |

(Continued)

FOREIGN PATENT DOCUMENTS

EP   2 884 474 A1   6/2015

OTHER PUBLICATIONS

Extended European search report for corresponding EP patent application 18177259.1, dated Nov. 22, 2018.

*Primary Examiner* — Padma Mundur
(74) *Attorney, Agent, or Firm* — Husch Blackwell LLP

(57) ABSTRACT

Systems and methods for synchronizing wireless sensor devices connected to a control panel device via multiple access point devices are provided. Some methods can include a control panel device periodically transmitting a time signal to an access point device, the access point device periodically receiving the time signal from the control panel device and using the time signal to synchronize with the control panel device, the access point device periodically transmitting a wireless beacon that includes a timestamp of the access point device to a sensor device, and the sensor device periodically exiting a sleep mode to receive the wireless beacon from the access point device and using the timestamp to synchronize with the access point device.

15 Claims, 4 Drawing Sheets

(56) References Cited

U.S. PATENT DOCUMENTS

2015/0163758 A1* 6/2015 Frison ................. H04W 56/004
                                                        370/350
2016/0029346 A1   1/2016 Suresh et al.
2016/0262120 A1   9/2016 Shani et al.
2018/0130315 A1* 5/2018 Feltham ............... G08B 3/1016

* cited by examiner

SYSTEMS AND METHODS FOR SYNCHRONIZING WIRELESS SENSOR DEVICES CONNECTED TO A CONTROL PANEL DEVICE VIA MULTIPLE ACCESS POINT DEVICES

FIELD

The present invention relates to wireless sensor devices. More particularly, the present invention relates to systems and methods for synchronizing wireless sensor devices connected to a control panel device via multiple access point devices.

BACKGROUND

It is known that an access point device can be the coordinator, center, and initiator of an IEEE 802.15.4 based low power wireless personal area network (WPAN). However, due to the limitations of wireless protocols and the limited memory in access point devices, the number of wireless sensor devices connected to a single access point device is limited. For example, some known access point devices can be connected to 64 sensor device nodes or 128 sensor device nodes. In known RF6 WPANs, one access point device can support 128 sensor device nodes.

When known commercial wireless systems require and support hundreds or thousands of sensor devices, multiple access point devices are required to connect the sensor devices. Therefore, the multiple access point devices must also be connected to a control panel device in a corresponding wired or wireless manner. For example, as seen in FIG. 1, the access point devices AP1-AP8 can be connected to the control panel device 100 via a wired or wireless data bus 110, and each of the access point devices AP1-AP8 can coordinate a respective WPAN for connecting to a respective plurality of sensor devices. In known RF6 WPANs, the control panel device can support 1024 sensor device nodes by connecting eight access point devices. However, such configurations present the problem of synchronizing the WPANs of the multiple access point devices to achieve a time critical feature, such as a One Go All Go feature.

When the One Go All Go feature is achieved and there is an emergency alarm in the system, such as a smoke alarm or a carbon monoxide (CO) alarm, sounder devices in the sensor devices, such as smoke detectors or CO detectors, are activated and synchronized with the temporal pattern alarm cadence of other sensor devices and siren devices installed in the same system. For example, the sensor devices can be synchronized with a temporal pattern 3 alarm cadence during the smoke alarm, which is graphically depicted in FIG. 2 and requires accuracy of +/-50 ms. Similarly, the sensor devices can be synchronized with a temporal pattern 4 alarm cadence during the CO alarm, which is graphically depicted in FIG. 3 and requires accuracy of +/-10 ms. However, when the sensor devices are connected to the control panel device via multiple access point devices, achieving such synchronization can be difficult.

In view of the above, there is a continuing, ongoing need for improved systems and methods.

DETAILED DESCRIPTION

Figure 1:
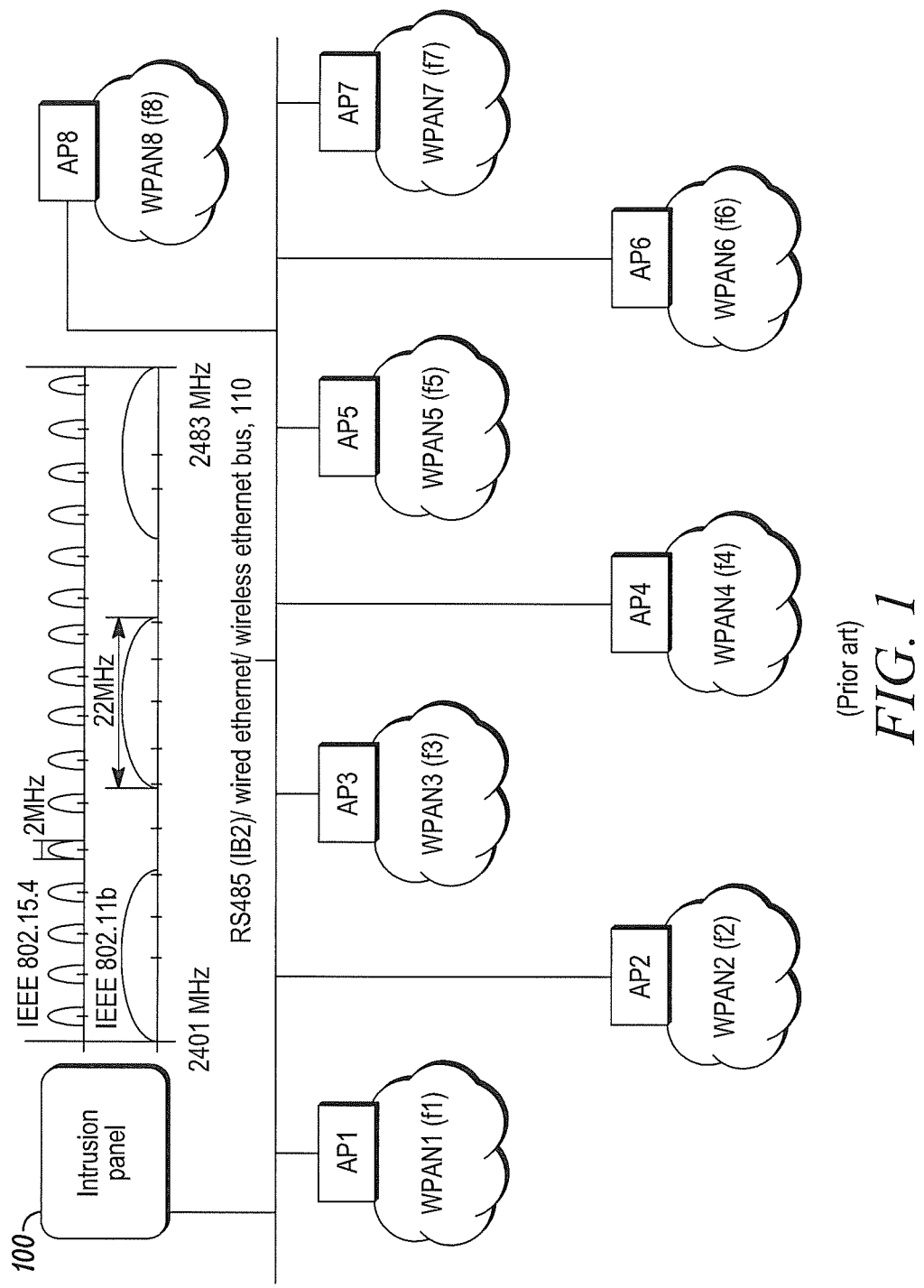
FIG. 1 is a block diagram of a system known in the art.
Figure 2:
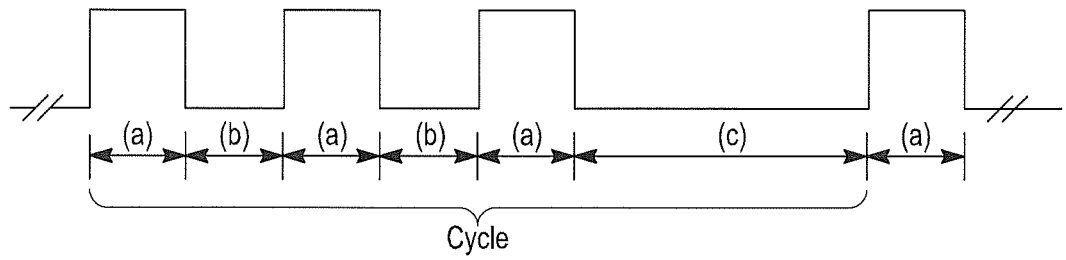
FIG. 2 is a graph of a temporal pattern alarm cadence for a smoke alarm known in the art.
Figure 3:
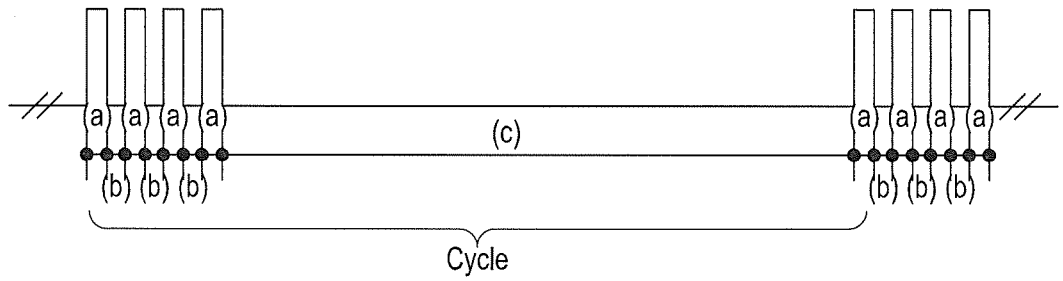
FIG. 3 is a graph of a temporal pattern alarm cadence for a carbon monoxide alarm known in the art.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein can include systems and methods for synchronizing wireless sensor devices connected to a control panel device via multiple access point devices. It is to be understood that systems and methods disclosed herein can be implemented in connection with a security system, a fire alarm system, a smoke alarm system, a carbon monoxide detection system, or any connected system that includes Internet of things (IoT) devices.

Figure 4:
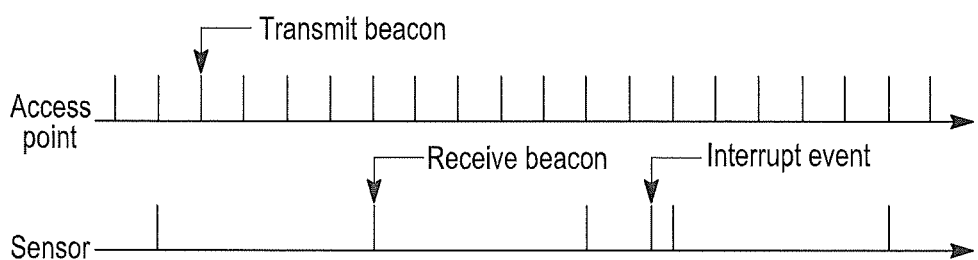
FIG. 4 is a graph depicting the timing of a sensor device tracking a beacon from an access point device in accordance with disclosed embodiments.

In accordance with disclosed embodiments and as seen in FIG. 4, each access point device connected to the control panel device can periodically transmit a wireless beacon to the sensor devices wirelessly connected thereto. The sensor devices can remain in a sleep mode and periodically exit the sleep mode to track the beacon. However, in some embodiments, the sensor devices can also exit the sleep mode responsive to an external interrupt signal to force the sensor devices to adjust their sleep timers to exit the sleep mode at the transmission time for the next beacon before re-entering the sleep mode. In this manner, the sensor devices can have long periods of time in the sleep mode and yet have a low latency when reacting to external events.

Figure 5:
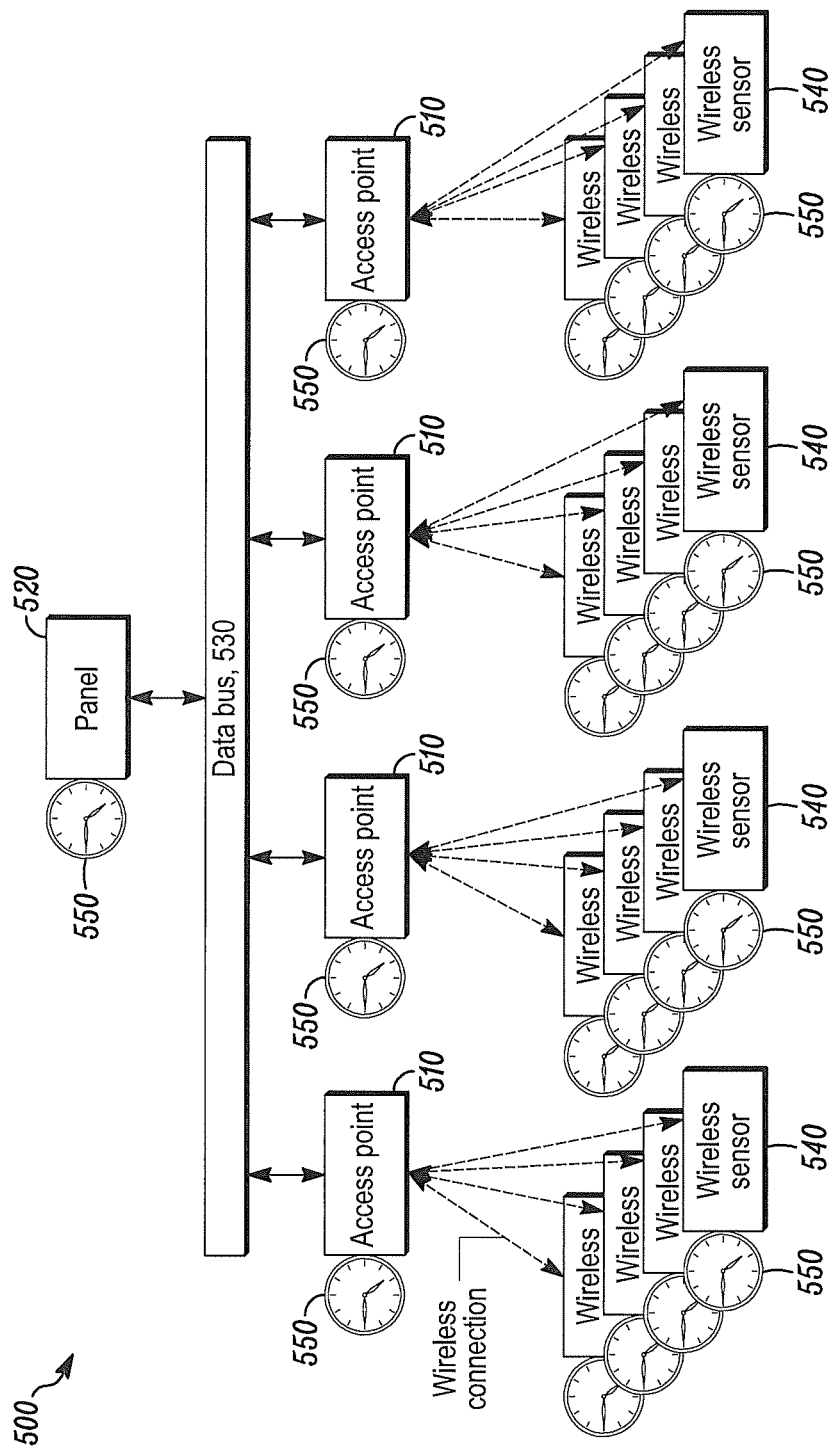
FIG. 5 is a block diagram of a system in accordance with disclosed embodiments.

FIG. 5 is a block diagram of a system 500 in accordance with disclosed embodiments. As seen in FIG. 5, each of the access point devices 510 can be connected to the control panel device 520 via a wired or wireless data bus 530, such as an IB2 or Ethernet bus, and each of the access point devices 510 can form a WPAN for wirelessly connecting with a plurality of sensor devices 540. Furthermore, each of the access point devices 510 and each of the plurality of sensor devices 540 can include a respective local clock 550 for timing. In accordance with disclosed embodiments, systems and methods disclosed herein can include a timestamp mechanism with the wireless beacon disclosed and described herein to provide a time baseline for synchronizing each of the access point devices 510 and each of the plurality of sensor devices 540.

For example, the control panel device 520 can periodically broadcast its real time over the data bus 530 so that each of the access point devices 510 can synchronize with the control panel device 520 by adjusting the respective local clock 550 of a respective one of the access point devices 510. In some embodiments, an access point device 510 can adjust its local clock 550 by adding the real time of the control panel device 520 as broadcast and a transport latency time between the control panel device 520 and the access point device 510.

Similarly, each of the access point devices 510 can periodically broadcast its real time in a payload of the wireless beacon, that is, timestamp the wireless beacon, so that, when exiting the sleep mode to track the beacon, each of the plurality of sensor devices 540 connected thereto can synchronize with a respective one of the access points 510 by adjusting the respective local clock 550 of a respective one of the plurality of sensor devices 540. For example, when a sensor device 540 wakes up to receive the beacon from an access point device 510, the sensor device 540 can receive the timestamp of the beacon from the access point device 510 and synchronize with the access point device 510 by adjusting the local clock 550 of the sensor device 540. In some embodiments, the sensor device 540 can adjust its local clock by adding the timestamp of the beacon and a transport latency time between the access point device 510 and the sensor device 540.

Figure 6:
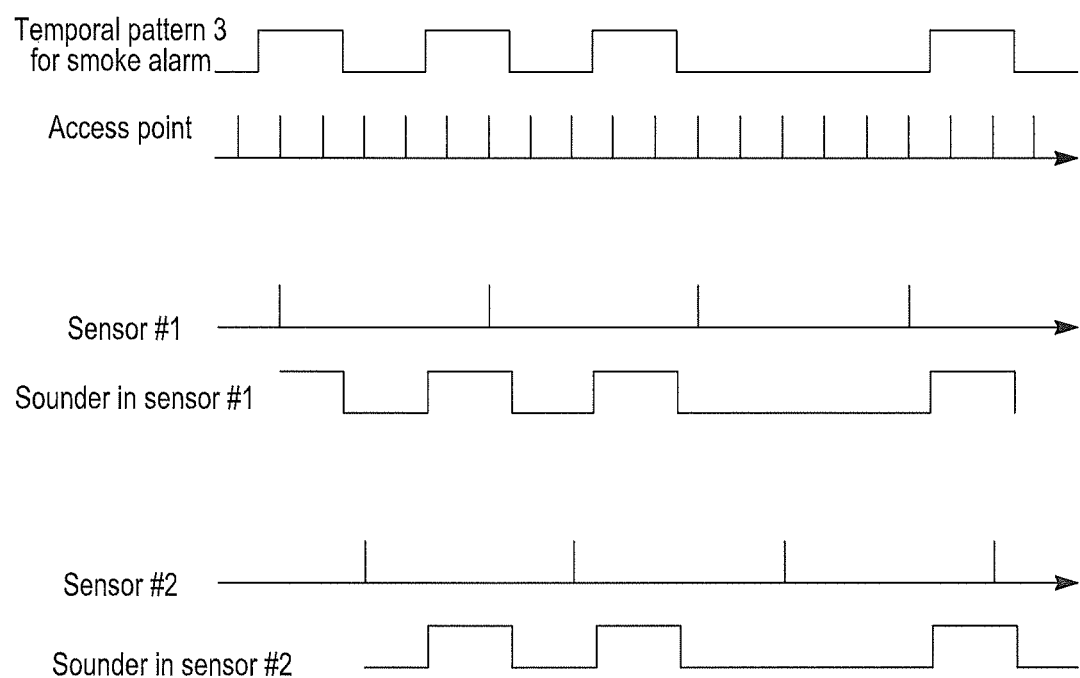
FIG. 6 is a graph depicting the timing of sensor devices synchronizing with an access point device so sounder devices in the sensor devices emit audible signals with the same, synchronized temporal pattern alarm cadence.

In accordance with disclosed embodiments, when there is an emergency alarm in the system 500, a One Go All Go feature can be achieved. For example, as graphically depicted in FIG. 6, each of the access point devices 510 can broadcast a starting point of a temporal pattern alarm cadence in the wireless beacon. When exiting the sleep mode to track the beacon, each of the plurality of sensor devices 540 connected thereto can receive the starting point of the temporal pattern alarm cadence and the timestamp of the beacon and can use the received information to calculate the current phase of the temporal pattern alarm cadence. In some embodiments, a sensor device 540 can calculate the current phase of the temporal pattern alarm cadence by calculating a gap between the starting point of the temporal pattern alarm cadence and a time of the local clock of the sensor device 540. Then, a respective sounder device of each of the plurality of sensor devices 540 can emit an audible signal with the temporal pattern alarm cadence starting from the current phase.

It is to be understood that each of the control panel, the access point devices, and the sensor devices disclosed and described herein can include a respective transceiver device and a memory device each of which can be in communication with respective control circuitry, a respective programmable processor, and respective executable control software as would be understood by one of ordinary skill in the art. The executable control software can be stored on a transitory or non-transitory computer readable medium, including, but not limited to local computer memory, RAM, optical storage media, magnetic storage media, flash memory, and the like. In some embodiments, some or all of the control circuitry, the programmable processors, and the executable control software can execute and control at least some of the methods disclosed and described herein.

Although a few embodiments have been described in detail above, other modifications are possible. For example, the logic flows described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A method comprising:
   an access point device periodically receiving a time signal from a control panel device and using the time signal to synchronize with the control panel device;
   the access point device periodically transmitting a wireless beacon that includes a starting point of a temporal pattern alarm cadence and a timestamp of the access point device to a sensor device for use by the sensor device to synchronize with the access point device and to calculate a current phase of the temporal pattern alarm cadence by calculating a gap between the starting point of the temporal pattern alarm cadence and a first real time of a first local clock of the sensor device.

2. The method of claim 1, wherein the time signal includes a second real time of the control panel device.

3. The method of claim 2, wherein the access point device synchronizes with the control panel device by using the second real time of the control panel device to adjust a second local clock of the access point device to a third real time.

4. The method of claim 3, wherein the access point device adjusts the second local clock of the access point device to the third real time by adding the second real time of the control panel device and a transport latency time between the control panel device and the access point device.

5. The method of claim 3, wherein the timestamp of the access point device includes the third real time of the access point device.

6. The method of claim 1, wherein a payload of the wireless beacon includes the timestamp of the access point device.

7. The method of claim 1, wherein the timestamp of the access point device includes a second real time of the access point device.

8. A method comprising:
   a sensor device periodically exiting a sleep mode to receive a wireless beacon that includes a starting point of a temporal pattern alarm cadence and a timestamp of an access point device from the access point device;
   the sensor device using the timestamp of the access point device to synchronize with the access point device; and
   the sensor device using the timestamp of the access point device and the starting point of the temporal pattern alarm cadence to calculate a current phase of the temporal pattern alarm cadence by calculating a gap between the starting point of the temporal pattern alarm cadence and a first real time of a local clock of the sensor device.

9. The method of claim 8, wherein a payload of the wireless beacon includes the timestamp of the access point device.

10. The method of claim 8, wherein the timestamp of the access point device includes a second real time of the access point device.

11. The method of claim 10, wherein the sensor device synchronizes with the access point device by using the second real time of the access point device to adjust the local clock of the sensor device to a third real time.

12. The method of claim 11, wherein the sensor device adjusts the local clock of the sensor device to the third real time by adding the second real time of the access point device to a transport latency time between the access point device and the sensor device.

13. The method of claim 10, wherein the second real time of the access point device is synchronized with a control panel device connected to the access point device.

14. The method of claim 8 further comprising:
a sounder device of the sensor device emitting an audible signal with the temporal pattern alarm cadence starting from the current phase.

15. A system comprising:
a control panel device;
an access point device; and
a sensor device,
wherein the control panel device periodically transmits a time signal to the access point device,
wherein the access point device periodically receives the time signal from the control panel device and uses the time signal to synchronize with the control panel device,
wherein the access point device periodically transmits a wireless beacon that includes a starting point of a temporal pattern alarm cadence and a timestamp of the access point device to the sensor device,
wherein the sensor device periodically exits a sleep mode to receive the wireless beacon from the access point device and uses the timestamp to synchronize with the access point device, and
wherein the sensor device uses the timestamp of the access point device and the starting point of the temporal pattern alarm cadence to calculate a current phase of the temporal pattern alarm cadence by calculating a gap between the starting point of the temporal pattern alarm cadence and a real time of a local clock of the sensor device.

\* \* \* \* \*